US008849067B2

(12) United States Patent
Sasaki

(10) Patent No.: US 8,849,067 B2
(45) Date of Patent: Sep. 30, 2014

(54) IMAGE PROCESSING APPARATUS, COMPUTER-READABLE STORAGE MEDIUM, AND IMAGE PROCESSING METHOD FOR IMPROVING IMAGE DATA TRANSFER

(75) Inventor: Fumihiro Sasaki, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 92 days.

(21) Appl. No.: 13/571,862

(22) Filed: Aug. 10, 2012

(65) Prior Publication Data

US 2013/0039602 A1 Feb. 14, 2013

(30) Foreign Application Priority Data

Aug. 12, 2011 (JP) ................................ 2011-177240
Feb. 13, 2012 (JP) ................................ 2012-028745
Jul. 27, 2012 (JP) ................................ 2012-167717

(51) Int. Cl.
*G06K 9/32* (2006.01)
*H04N 5/00* (2011.01)

(52) U.S. Cl.
CPC ... *G06K 9/32* (2013.01); *H04N 5/00* (2013.01)
USPC ....................................................... 382/298

(58) Field of Classification Search
None
See application file for complete search history.

(56) References Cited

U.S. PATENT DOCUMENTS

| 4,766,447 | A | * | 8/1988 | Tsukada ........................ 347/129 |
| 5,070,324 | A | * | 12/1991 | Furushima ..................... 345/172 |
| 6,546,132 | B1 | * | 4/2003 | Bhattacharjya et al. ...... 382/167 |
| 7,751,074 | B2 | * | 7/2010 | Kaneko ........................ 358/1.15 |
| 2009/0208139 | A1 | * | 8/2009 | Ishikawa et al. .............. 382/305 |
| 2011/0051157 | A1 | | 3/2011 | Oteki | |
| 2012/0047299 | A1 | | 2/2012 | Sasaki | |

FOREIGN PATENT DOCUMENTS

JP 2011-055214 3/2011

* cited by examiner

*Primary Examiner* — Bhavesh Mehta
*Assistant Examiner* — Feng Niu
(74) *Attorney, Agent, or Firm* — Harness, Dickey & Pierce, P.L.C.

(57) ABSTRACT

According to an embodiment, an image processing apparatus includes: a reading unit, a magnification change processing unit, a wait time acquiring unit, and a signal output unit. The reading unit reads image data from the memory line by line. The magnification change processing unit performs a magnification change process on the image data and outputs. The wait time acquiring unit acquires wait time information on a value corresponding to a wait time from when a synchronous signal, representing a start of read of the image data for each line, falls to when the magnification change process starts. The signal output unit outputs, to the reading unit, a permission signal indicating whether read of image data of a next line is permitted or denied based on the wait time information while the magnification change processing unit is outputting the image data.

7 Claims, 10 Drawing Sheets

IMAGE PROCESSING APPARATUS, COMPUTER-READABLE STORAGE MEDIUM, AND IMAGE PROCESSING METHOD FOR IMPROVING IMAGE DATA TRANSFER

CROSS REFERENCES TO RELATED APPLICATIONS

The present application claims priority to and incorporates by reference the entire contents of Japanese Patent Application No. 2011-177240, filed on Aug. 12, 2011, Japanese Patent Application No. 2012-028745, filed on Feb. 13, 2012, and Japanese Patent Application No. 2012-167717, filed on Jul. 27, 2012.

BACKGROUND OF THE INVENTION

1. Field of the Invention

The present invention relates to an image processing apparatus, a computer-readable storage medium, and an image processing method.

2. Description of the Related Art

Conventionally, in a multifunction peripheral (MFP) with a system for simultaneously reading images of the front and back sides of an object, a process is performed such that images simultaneously read from the front and back sides are stored in a memory on an engine side; and the images of the front and back sides are sequentially read from the memory, subjected to predetermined image processing, and transmitted to a memory on a controller side.

In the MFP with the system for simultaneously reading images of the front and back sides, when, for example, image processing such as an enlargement process is performed on images accumulated in the memory on the engine side, a magnification change processing unit that executes the enlargement process generates a signal indicating whether or not image data of a next line is needed. In the MFP with the system for simultaneously reading images of the front and back sides, read of image data of one line from the memory on the engine side is stopped or started according to the value of the generated signal (Japanese Patent Application Laid-open No. 2011-055214).

However, in the conventional technology, when the images accumulated in the memory on the engine side are subjected to the image processing and are transmitted to the controller, data transfer efficiency in the transmission of the images to the controller may be lowered. Specifically, in the conventional technology, when image processing such as an image property correction process, a color conversion, a gradation process, or a magnification change process is performed; a process for generating the signal indicating whether or not the image data of the next line is needed; that is, a process for reading image data of one line from the memory on the engine side is delayed by a wait time needed for execution of the image processing or by a minimum delay time needed for a process starting from input of data to be subjected to the image processing and ending with output of the data subjected to the image processing. As a result, in the conventional technology, the data transfer efficiency in the transmission of the images to the controller is lowered.

Therefore, there is a need to provide an image processing apparatus, a computer-readable storage medium for an image processing, and an image processing method capable of improving data transfer efficiency in transmission of images to a controller when the images accumulated in a memory on an engine side are subjected to image processing and transmitted to the controller.

SUMMARY OF THE INVENTION

It is an object of the present invention to at least partially solve the problems in the conventional technology.

According to an embodiment, an image processing apparatus includes: a reading unit, a magnification change processing unit, a wait time acquiring unit, and a signal output unit. The reading unit reads image data, which is obtained by scanning and accumulated in a memory, from the memory line by line. The magnification change processing unit performs a magnification change process on the image data read by the reading unit and outputs the image data subjected to the magnification change process. The wait time acquiring unit acquires wait time information on a value corresponding to a wait time from when a synchronous signal, representing a start of read of the image data for each line, falls to when the magnification change process starts. The signal output unit outputs, to the reading unit, a permission signal indicating whether read of image data of a next line is permitted or denied based on the wait time information while the magnification change processing unit is outputting the image data.

According to another embodiment, a non-transitory computer-readable storage medium includes an executable program codes stored therein. The program codes when executed by a computer instructs the computer to perform: reading image data, which is obtained by scanning and accumulated in a memory, from the memory line by line; performing a magnification change process on the image data read at the reading; outputting the image data subjected to the magnification change process; acquiring wait time information on a value corresponding to a wait time from when a synchronous signal, representing a start of read of the image data for each line, falls to when the magnification change process starts, and outputting a permission signal indicating whether read of image data of a next line is permitted or denied based on the wait time information while the image data is being output at the outputting.

According to still another embodiment, there is provided an image processing method for an image processing apparatus. The image processing method includes: reading, by a reading unit of the image processing apparatus, image data, which is obtained by scanning and accumulated in a memory, from the memory line by line; performing, by a magnification change processing unit of the image processing apparatus, a magnification change process on the image data read at the reading; outputting, by the magnification change processing unit of the image processing apparatus, the image data subjected to the magnification change process; acquiring, by a wait time information acquiring unit of the image processing apparatus, wait time information on a value corresponding to a wait time from when a synchronous signal, representing a start of read of the image data for each line, falls to when the magnification change process starts, and outputting, by a signal output unit of the image processing apparatus, a permission signal indicating whether read of image data of a next line is permitted or denied based on the wait time information while the image data is being output at the outputting.

The above and other objects, features, advantages and technical and industrial significance of this invention will be better understood by reading the following detailed descrip-

DETAILED DESCRIPTION OF THE PREFERRED EMBODIMENTS

Exemplary embodiments of the present invention will be explained in detail below with reference to the accompanying drawings. The present invention is not limited by the embodiments below. The embodiments can be combined appropriately as long as the consistency of the present invention is maintained.

First Embodiment

System Configuration

Figure 1:
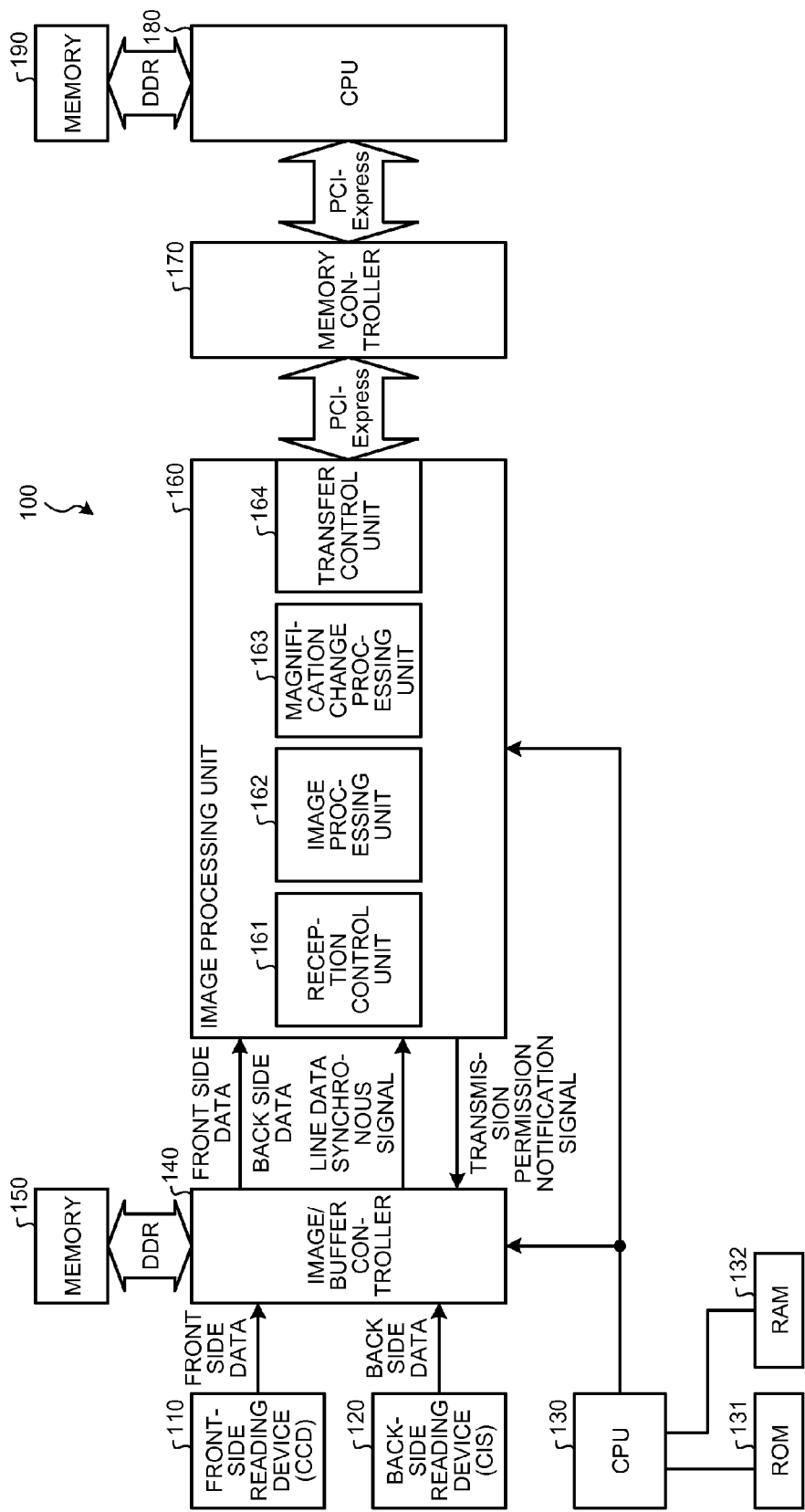
FIG. 1 is a diagram illustrating a configuration example of an image processing apparatus according to a first embodiment.

A configuration of an image processing apparatus according to a first embodiment will be explained below with reference to FIG. 1. FIG. 1 is a diagram illustrating a configuration example of the image processing apparatus according to the first embodiment.

As illustrated in FIG. 1, an image processing apparatus 100 includes a front-side reading device (a charge coupled device: CCD) 110, a back-side reading device (a contact image sensor: CIS) 120, a central processing unit (CPU) 130, a read only memory (ROM) 131, a random access memory (RAM) 132, an image/buffer controller 140, a memory 150, an image processing unit 160, a memory controller 170, a CPU 180, and a memory 190. As one embodiment, the image processing apparatus 100 is a multifunction peripheral (MFP) with a system for simultaneously reading images of front and back sides of an object.

The front-side reading device 110 reads a predetermined one side (front side) of an original and outputs image data of the read side (front side data) to the image/buffer controller 140. The back-side reading device 120 reads the other side (back side) of the original read by the front-side reading device 110 and outputs image data of the read side (back side data) to the image/buffer controller 140. The CPU 130 controls registers of the image/buffer controller 140, the image processing unit 160, and the like. The ROM 131 stores therein a control program used by the CPU 130. The RAM 132 is a memory used as a working memory by the CPU 130 for the control.

The image/buffer controller 140 receives the front side data from the front-side reading device 110 and the back side data from the back-side reading device 120; and registers the received front side data and the received back side data in the memory 150 via a bus (double data rate (DDR)). After the CPU 130 performs a control process for starting activation, the image/buffer controller 140 reads the front side data or the back side data accumulated in the memory 150, and transmits the read data to the image processing unit 160 together with a line data synchronous signal indicating a start of read of image data for each line. To transmit the image data, the image/buffer controller 140 stops or starts image data transfer in accordance with a transmission permission notification signal, which indicates whether transmission of image data is permitted or denied and which is sent by the image processing unit 160. Specifically, to transmit the front side data and the back side data, the image/buffer controller 140 sequentially performs processes for transmitting the front side data and thereafter transmitting the back side data in accordance with the transmission permission notification signal.

The image processing unit 160 is an application specific integrated circuit (ASIC) that performs image processing, such as a process for correcting properties of a scanned image (hereinafter, described as a "scanned image property correction process"), a color conversion, a gradation process, or a magnification change process, on the image data transmitted by the image/buffer controller 140, and transfers the image data subjected to the image processing to the memory controller 170 via a peripheral components interconnects (PCI) Express bus.

A reception control unit 161 is an interface module that controls reception of various types of image data transmitted by the image/buffer controller 140. An image processing unit 162 is a module that performs a scanned image property correction process, a color conversion, or a gradation process on input image data. A magnification change processing unit 163 is a module that performs a magnification change process on the input image data. A transfer control unit 164 is a module that controls image data transfer using, for example, PCI Express. Detailed processes performed by the image processing unit 160 will be described later.

The memory controller 170 is an ASIC as a peripheral device of a controller. The CPU 180 is, for example, a CPU on the controller side. The memory 190 is a memory on the controller side.

Configuration of Conventional Image Processing Unit

Figure 9:
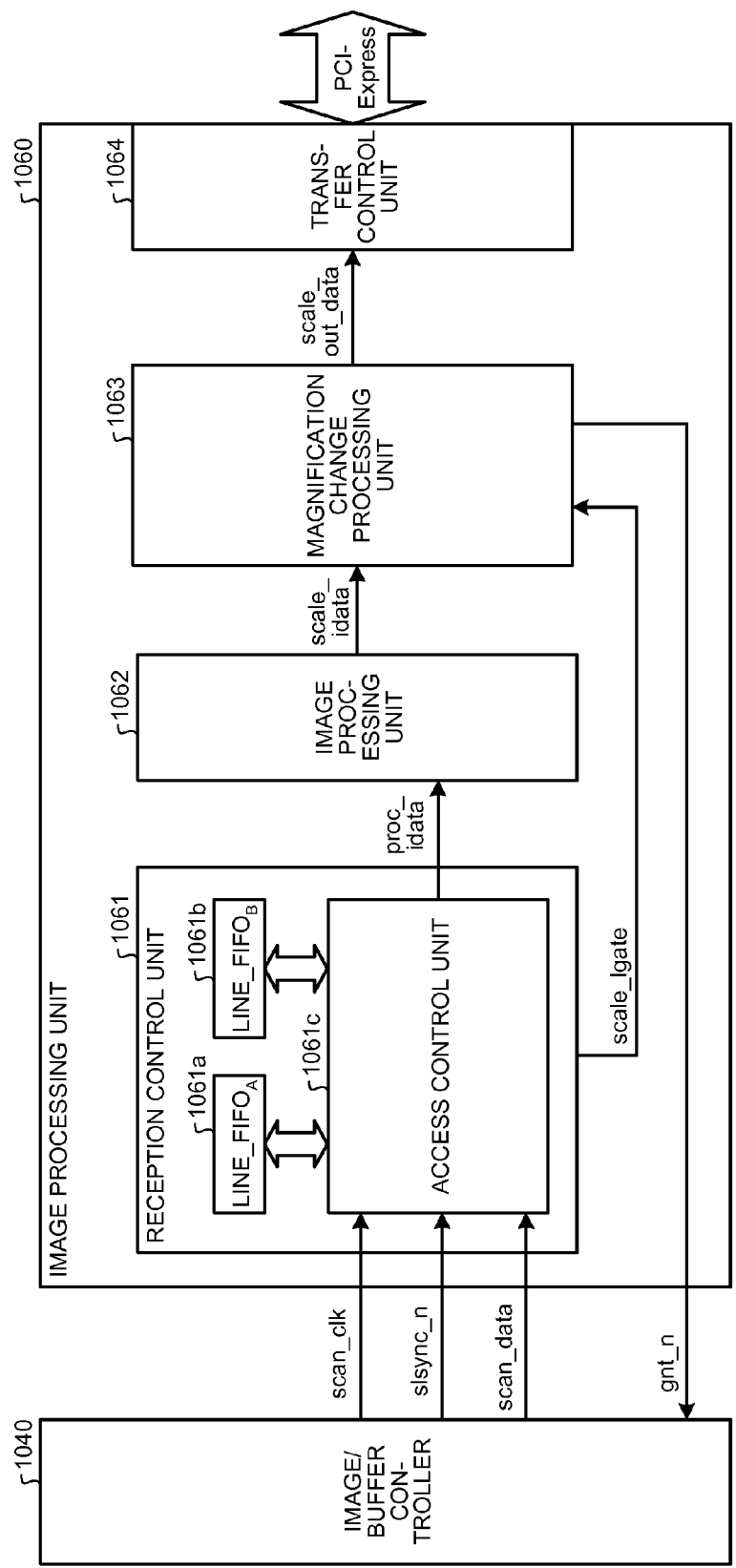
FIG. 9 is a diagram illustrating a configuration example of an image processing unit according to a conventional technology.

A configuration of an image processing unit according to the conventional technology will be explained below with reference to FIG. 9. FIG. 9 is a diagram illustrating a configuration example of the image processing unit according to the conventional technology.

In FIG. 9, "scan_clk" denotes a transfer clock for the front side data and the back side data. "slsync_n" denotes a line data synchronous signal transmitted from an image/buffer controller 1040 to an image processing unit 1060. At the fall timing of the line data synchronous signal "slsync_n", transfer of image data of one line starts. "scan_data" denotes the image data of one line transmitted from the image/buffer controller 1040 to the image processing unit 1060.

A LINE_FIFO$_A$ (first in first out) 1061a is a memory for storing the image data of one line received by a reception control unit 1061. Similarly, a LINE_FIFO$_B$ 1061b is a memory for storing the image data of one line received by the reception control unit 1061. An access control unit 1061c is a module that controls write access and read access to the LINE_FIFO$_A$ 1061a and the LINE_FIFO$_B$ 1061b.

Specifically, the access control unit 1061c writes the image data of one line "scan_data" to the LINE_FIFO$_A$ 1061a or the LINE_FIFO$_B$ 1061b in synchronization with the transfer clock "scan_clk", by using the fall of the line data synchronous signal "slsync_n" transmitted by the image/buffer controller 1040 as a trigger. Then, the access control unit 1061c reads data from the LINE_FIFO$_A$ 1061a or the LINE_FIFO$_B$ 1061b in synchronization with an internal clock of the image processing unit 1060 and transmits image data "proc_idata" to an image processing unit 1062. Operations related to the write access and the read access are performed in parallel to each other. As one embodiment, the FIFO to be a target of write or read is determined by toggle switch control between the LINE_FIFO$_A$ 1061a and the LINE_FIFO$_B$ 1061b at the fall timing of the line data synchronous signal "slsync_n".

"proc_idata" denotes image data that is output from the reception control unit 1061 to the image processing unit 1062 in synchronization with the internal clock of the image processing unit 1060. "scale_lgate" denotes a signal indicating that image data to be subjected to a magnification change process is input from the reception control unit 1061 to a magnification change processing unit 1063. For example, the signal "scale_lgate", indicating input of image data to be subjected to the magnification change process, is active when the signal is set to "High". An assertion timing and an assertion period based on the fall timing of the line data synchronous signal "slsync_n" are uniquely determined by a register set value which is set in consideration of a delay of a process performed by the reception control unit 1061 or the image processing unit 1062.

"scale_idata" denotes image data that is output from the image processing unit 1062 to the magnification change processing unit 1063 in synchronization with the internal clock of the image processing unit 1060. "scale_out_data" denotes image data that is output from the magnification change processing unit 1063 to a transfer control unit 1064 in synchronization with the internal clock of the image processing unit 1060. "gnt_n" denotes a transmission permission notification signal, which indicates whether transmission of image data is permitted or denied and which is output from the magnification change processing unit 1063 to the image/buffer controller 1040. For example, the transmission permission notification signal "gnt_n" indicates permission by "Low" and denial by "High". A signal value of the transmission permission notification signal "gnt_n" is set to "Low" when the magnification change processing unit 1063 starts outputting image data of one line, and is set to "High" when the output of the image data of one line is completed.

Timing Chart of Conventional Image Data Transfer

Figure 10:
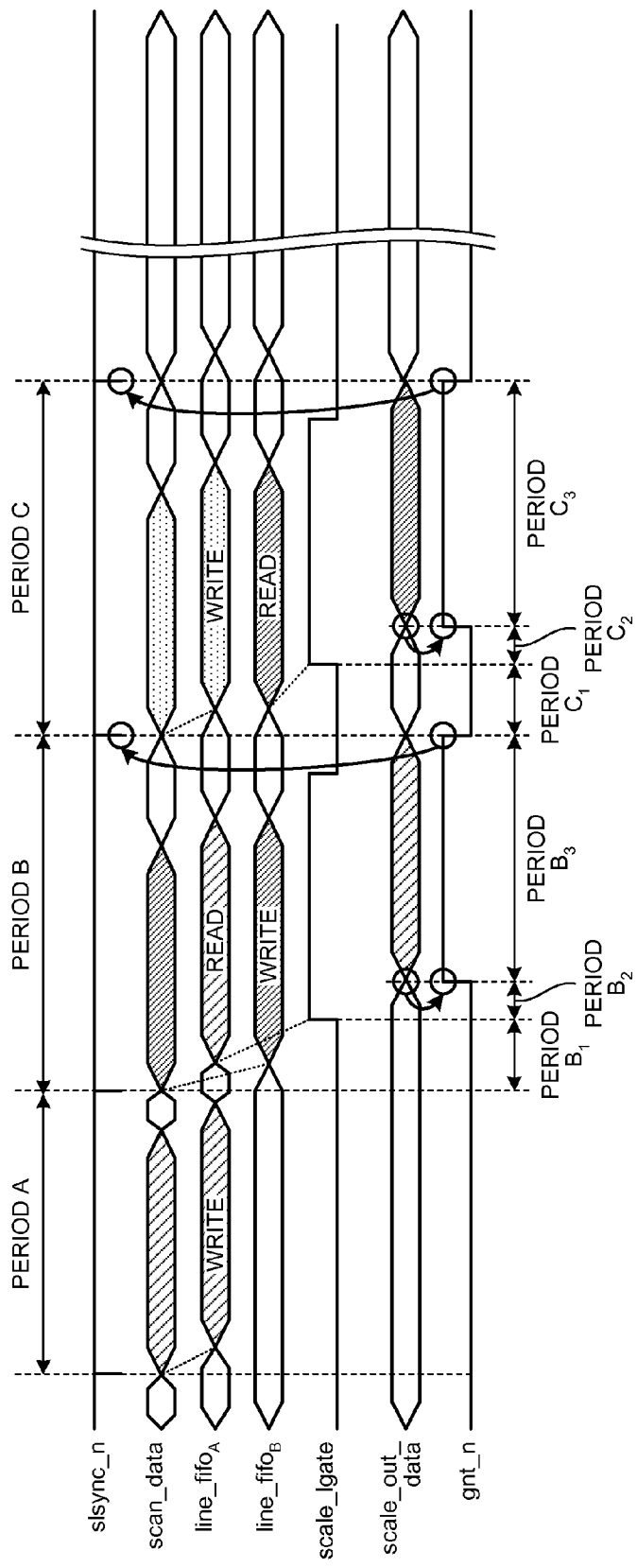
FIG. 10 is a timing chart illustrating an example of image data transfer in a magnification change process according to the conventional technology.

A timing chart of image data transfer in a magnification change process according to the conventional technology will be explained below with reference to FIG. 10. FIG. 10 is the timing chart illustrating an example of image data transfer in the magnification change process according to the conventional technology.

In FIG. 10, signals denoted by "slsync_n", "scan_data", "scale_lgate", "scale_out_data", and "gnt_n" are the same as the signals illustrated in FIG. 9. "line_fifo$_A$" denotes a transfer status of the LINE_FIFO$_A$ 1061a, and "line_fifo$_B$" denotes a transfer status of the LINE_FIFO$_B$ 1061b. Specifically, "WRITE" indicates that a write operation is in process; and "READ" indicates that a read operation is in process. In FIG. 10, image data of the same line is indicated by the same pattern.

In a period A in FIG. 10, the image/buffer controller 1040 outputs the image data of one line "scan_data" to the image processing unit 1060 at the fall timing of the line data synchronous signal "slsync_n". Furthermore, in the period A, the reception control unit 1061 writes the image data of one line transmitted by the image/buffer controller 1040 in the LINE_FIFO$_A$ 1061a.

In a period B in FIG. 10, the image/buffer controller 1040 outputs the image data of one line "scan_data" to the image processing unit 1060 at the fall timing of the line data synchronous signal "slsync_n". Furthermore, in the period B, the reception control unit 1061 writes the image data of one line transmitted by the image/buffer controller 1040 in the LINE_FIFO$_B$ 1061b.

Moreover, in the period B, the reception control unit 1061 reads the image data of one line that has been written in the LINE_FIFO$_A$ 1061a in the period A, and outputs the image data to a module in the subsequent stage. After the image data of one line is output to the module in the subsequent stage, the signal "scale_lgate" indicating input of the image data to be subjected to the magnification change process is set to "High". Thereafter, the magnification change processing unit 1063 outputs the image data "scale_out_data" subjected to the magnification change process to the transfer control unit 1064. At this time, the magnification change processing unit 1063 maintains the transmission permission notification signal at "High" indicating denial until output of the image data of one line is completed, that is, until a start of the magnification change process on image data of a next line is permitted.

Detailed explanation of the period B in the timing chart will be given below. In a period B$_1$, the image processing unit 1062 completes image processing on the first pixel of the image data of one line. Specifically, the period B$_1$ indicates a minimum wait time needed from when image data to be subjected to the image processing is input to the image processing unit 1062 to when the image data subjected to the image processing is output. In a period B$_2$, the magnification change processing unit 1063 completes the magnification change process on the first pixel of the image data of one line. Specifically, the period B2 indicates a minimum delay time needed from when the image data to be subjected to the magnification change process is input to the magnification change processing unit 1063 to when the image data subjected to the magnification change process is output. The wait time and the delay time are determined based on a magnification ratio specified by the register set value or based on the number of lines of the image data to be subjected to the magnification change process, where the number is input to the magnification change processing unit 1063.

In a period B$_3$, the image processing unit 1060 maintains the status of the transmission permission notification signal "gnt_n" as deassertion, that is, "High" which indicates denial, until the output of the image data of one line is completed after completion of the magnification change process by the magnification change processing unit 1063 and until a process on image data of a next line is permitted. Therefore, the image/buffer controller 1040 waits to transmit the image data of the next line in the period $B_3$. In the period $B_3$, the image processing unit 1060 changes the status of the transmission permission notification signal "gnt_n" to assertion, that is, "Low" which indicates permission, when the output of the image data of one line is completed after completion of the magnification change process by the magnification change processing unit 1063 and when a start of the process on the image data of the next line is permitted. Upon receiving the transmission permission notification signal "gnt_n" of "Low" indicating permission, the image/buffer controller 1040 starts transmission of the image data of the next line. Accordingly, a period C starts. A timing chart of the period C (a period $C_1$, a period $C_2$, and a period $C_3$) is the same as that of the period B.

As described above, in the conventional technology, a wait time to start the process on the image data of the next line increases due to the period $B_1$ and the period $B_2$, which are the wait time and the delay time caused by the processes performed by the image processing unit 1062 and the magnification change processing unit 1063. Furthermore, the period $B_3$ becomes longer as the enlargement ratio used in the magnification change process becomes greater. That is, the image/buffer controller 1040 needs to wait a longer time to start transmission of image data of the next line as the enlargement ratio becomes greater. As a result, in the conventional technology, when an image accumulated in a memory on the engine side is subjected to image processing and is thereafter transmitted to the controller, the data transfer efficiency in the transmission of the image to the controller becomes low.

Configuration of the Image Processing Unit of the First Embodiment

Figure 2:
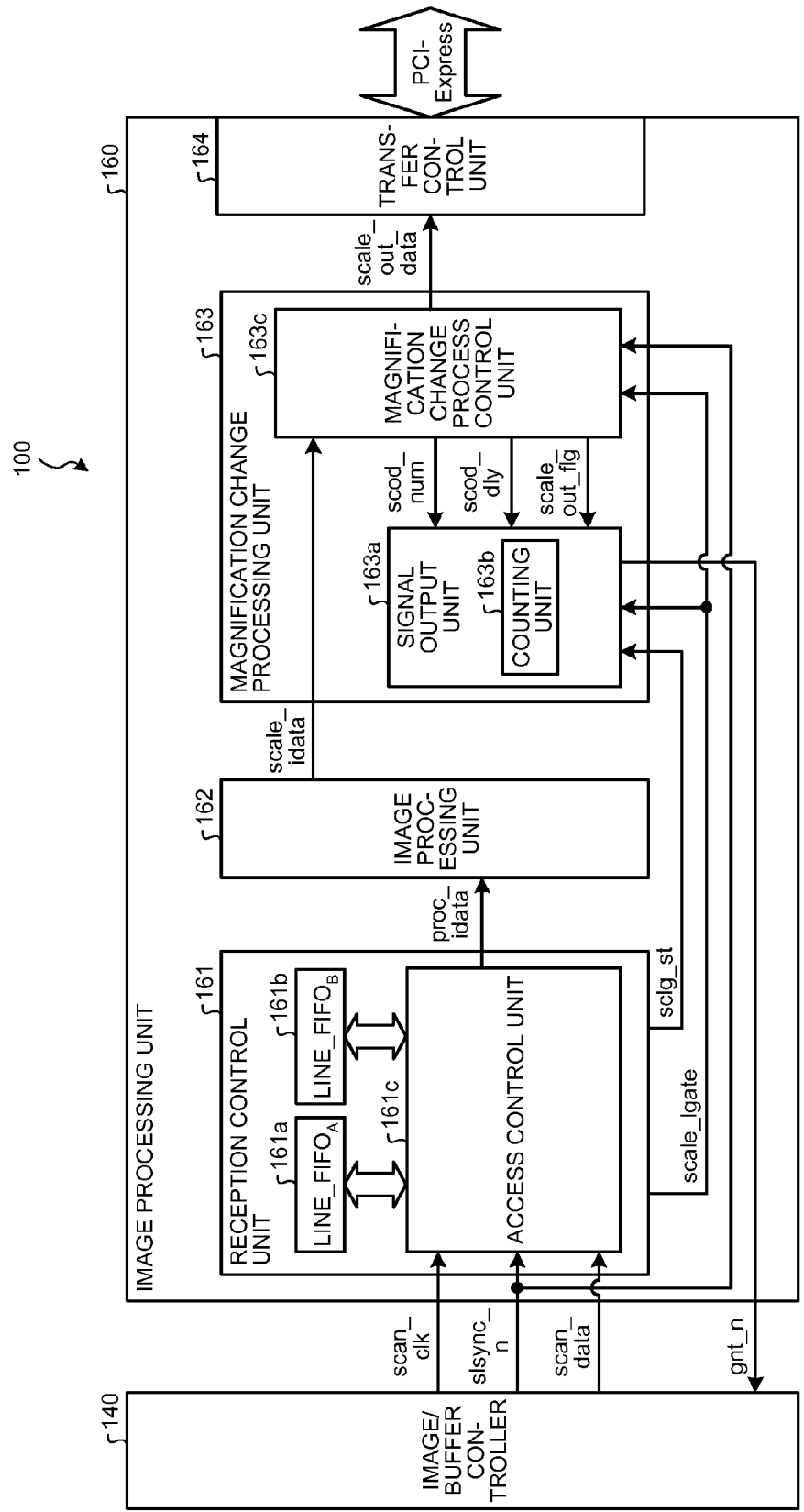
FIG. 2 is a diagram illustrating a configuration example of an image processing unit according to the first embodiment.

A configuration of the image processing unit 160 according to the first embodiment will be explained below with reference to FIG. 2. FIG. 2 is a diagram illustrating a configuration example of the image processing unit 160 according to the first embodiment. In FIG. 2, the same signals and data as those described in the configuration example of the image processing unit 1060 according to the conventional technology illustrated in FIG. 9 are denoted by the same reference names or symbols, and explanation thereof will be omitted appropriately. Here, numeral 161c corresponds to numeral 1601c in FIG. 9.

In FIG. 2, "sclg_st" denotes a signal containing a value of an internal register of the reception control unit 161 for setting a period from when the line data synchronous signal "slsync_n" falls to when the signal "scale_lgate" indicating input of image data to be subjected to the magnification change process is asserted. Namely, "sclg_st" is information corresponding to the period $B_1$ (wait time) illustrated in FIG. 10. "scale_out_flg" is a signal indicating that the image data obtained by the magnification change process performed by the magnification change processing unit 163 is being output. For example, the signal "scale_out_flg" indicating output of the image data subjected to the magnification change process indicates that the image data is being output (active) when the signal is set to "High".

"scod_num" is a signal containing the total number of pixels of the image data "scale_out_data" that is output from the magnification change processing unit 163 to the transfer control unit 164 after the magnification change process. Namely, "scod_num" is a signal containing the number of rises of the internal clock during assertion of "scale_out_flg". The value of "scod_num" is updated upon the fall of the line data synchronous signal "slsync_n".

"scod_dly" denotes a signal containing the number of rises of the internal clock during a period from when input of the image data to be subjected to the magnification change process starts to when output of the image data subjected to the magnification change process starts, that is, during a period from when assertion of the signal "scale_lgate" indicating input of the image data to be subjected to the magnification change process starts to when assertion of the signal "scale_out_flg" indicating output of the image data subjected to the magnification change process starts. Namely, "scod_dly" is information corresponding to the period $B_2$ (delay time) illustrated in FIG. 10. The value of "scod_dly" is updated upon the fall of the line data synchronous signal "slsync_n".

A magnification change process control unit 163c is a module that receives image data from the image processing unit 162, performs the magnification change process to enlarge or reduce the image data, and outputs the image data "scale_out_data" subjected to the magnification change process to the transfer control unit 164. The magnification change process control unit 163c outputs various signals, such as "scod_num", "scod_dly", or "scale_out_flg", to a signal output unit 163a in accordance with processes.

Specifically, upon receiving the image data subjected to the magnification change process from the image processing unit 162, the magnification change process control unit 163c obtains the total number of pixels from the received image data and outputs the signal "scod_num" containing the total number of the pixels to the signal output unit 163a. The magnification change process control unit 163c sets the signal "scale_out_flg" indicating output of the image data to "High" and outputs the signal to the signal output unit 163a while the image data subjected to the magnification change process is being output. The magnification change process control unit 163c outputs, to the signal output unit 163a, a signal "scod_dly" containing the number of rises of the internal clock in a period from a start of assertion of "scale_lgate" received from the reception control unit 161 to a start of assertion of "scale_out_flg" corresponding to the output of the image data subjected to the magnification change process. The magnification change process control unit 163c receives the line data synchronous signal "slsync_n" from the image/buffer controller 140 and updates the value of "scod_num" or "scod_dly" at the fall timing of the line data synchronous signal "slsync_n".

The signal output unit 163a is a module that controls the transmission permission notification signal "gnt_n". For example, a counting unit 163b counts the number of rises of the internal clock during assertion of "scale_out_flg" received from the magnification change process control unit 163c. The number counted by the counting unit 163b is denoted by "scod_cnt".

Signal control performed by the signal output unit 163a will be explained in detail below. The signal output unit 163a subtracts, from the total number of pixels "scod_num", the register value "sclg_st" and the number of rises "scod_dly" of the internal clock in a period from a start of assertion of a signal indicating input of image data to be subjected to magnification change process to a start of assertion of a signal indicating output of the image data subjected to the magnification change process. When the count number "scod_cnt" counted by the counting unit 163b is equal to or greater than a result value obtained by the subtraction, the signal output unit 163a sets the transmission permission notification signal "gnt_n" to "Low" indicating permission and outputs the signal to the image/buffer controller 140.

That is, when "scod_cnt≥scod_num−(sclg_st+scod_dly)" is satisfied, the signal output unit 163a sets the transmission permission notification signal "gnt_n" to "Low" indicating permission; and outputs the signal to the image/buffer controller 140. In other words, the signal output unit 163a sets the transmission permission notification signal "gnt_n" to "Low" indicating permission and outputs the signal to the image/buffer controller 140 at a time advanced by a time corresponding to the information on the wait time (the register value) and the information on the delay time (the number of rises of the internal clock in a predetermined period).

Timing Chart of Image Data Transfer According to the First Embodiment

Figure 3:
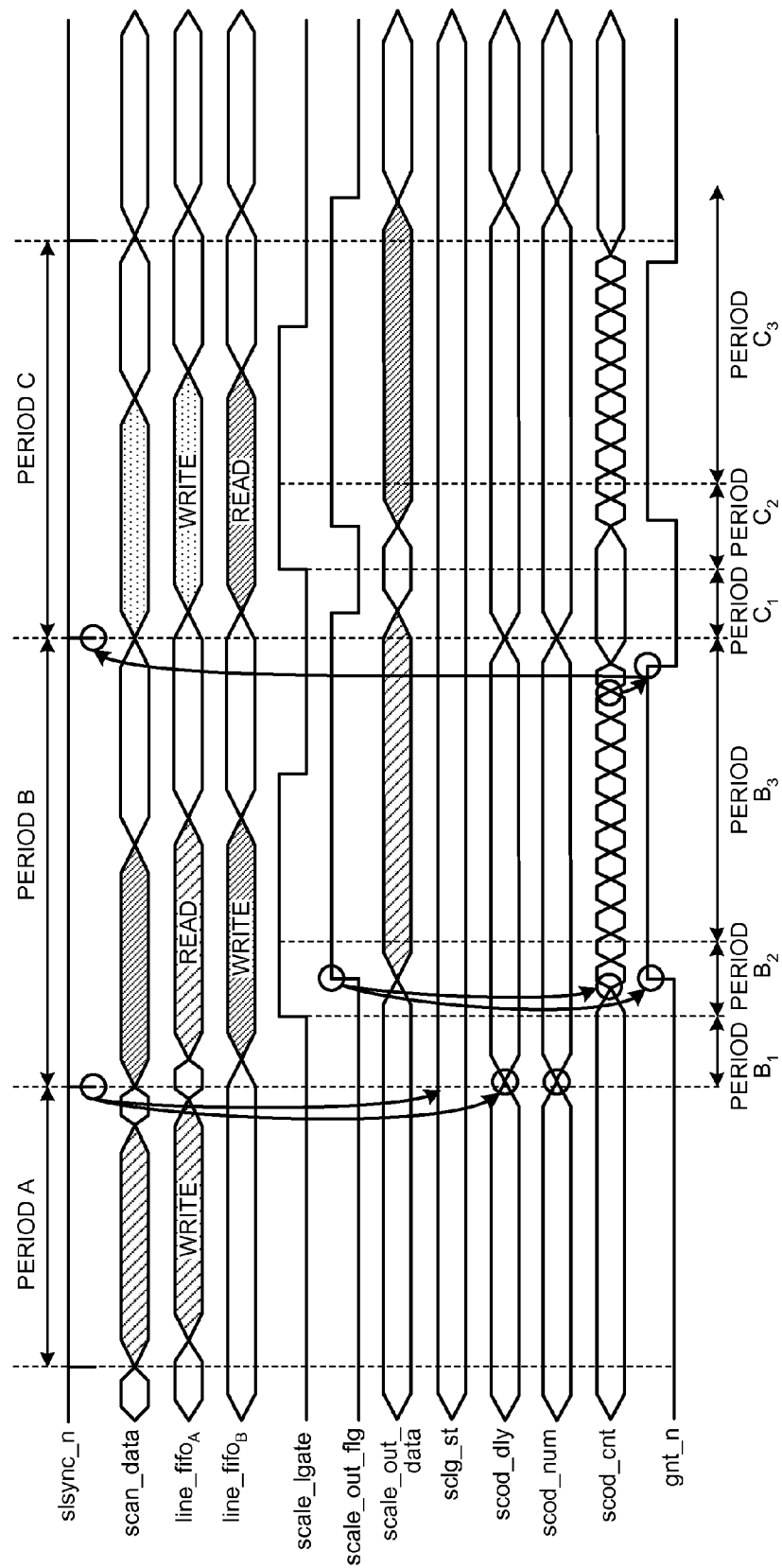
FIG. 3 is a timing chart illustrating an example of image data transfer in a magnification change process according to the first embodiment.

A timing chart of image data transfer in the magnification change process according to the first embodiment will be explained below with reference to FIG. 3. FIG. 3 is a timing chart illustrating an example of image data transfer in the magnification change process according to the first embodiment.

In FIG. 3, signals "slsync_n", "scan_data", "scale_lgate", "scale_out_flg", "scale_out_data", "sclg_st", "scod_dly", "scod_num", "gnt_n" are the same as the signals illustrated in FIG. 2. As described above, "scod_cnt" denotes the count number counted by the counting unit 163b. "line_fifo$_A$" denotes a transfer status of a LINE_FIFO$_A$ 161a and "line_fifo$_B$" denotes a transfer status of a LINE_FIFO$_B$ 161b. In FIG. 3, image data of the same line is indicated by the same pattern.

In a period A in FIG. 3, the image/buffer controller 140 outputs the image data of one line "scan_data" to the image processing unit 160 at the fall timing of the line data synchronous signal "slsync_n". Furthermore, in the period A, the reception control unit 161 writes the image data of one line transmitted by the image/buffer controller 140 in the LINE_FIFO$_A$ 161a.

In a period B in FIG. 3, the image/buffer controller 140 outputs the image data of one line "scan_data" to the image processing unit 160 at the fall timing of the line data synchronous signal "slsync_n". Furthermore, in the period B, the reception control unit 161 writes the image data of one line transmitted by the image/buffer controller 140 in the LINE_FIFO$_B$ 161b.

Moreover, in the period B, the reception control unit 161 reads the image data of one line that has been written in the LINE_FIFO$_A$ 161a in the period A, and outputs the image data to a module in the subsequent stage. After the image data of one line is output to the module in the subsequent stage, the signal "scale_lgate" indicating input of the image data to be subjected to the magnification change process is set to "High".

Furthermore, in the period B, upon receiving the image data to be subjected to the magnification change process via the image processing unit 162, the magnification change process control unit 163c obtains the total number of pixels from the received image data and outputs the signal "scod_num" containing the total number of the pixels to the signal output unit 163a. After completion of the magnification change process, the magnification change process control unit 163c outputs the image data "scale_out_data" subjected to the magnification change process to the transfer control unit 164. While the image data subjected to the magnification change process is being output, the magnification change process control unit 163c sets the signal "scale_out_flg" indicating that the image data subjected to the magnification change process is being output to "High" and outputs the signal to the signal output unit 163a. Furthermore, the magnification change process control unit 163c outputs, to the signal output unit 163a, the signal "scod_dly" containing the number of rises of the internal clock in a period from a start of assertion of the signal "scale_lgate" indicating input of the image data to be subjected to the magnification change process to a start of assertion of the signal "scale_out_flg" indicating output of the image data subjected to the magnification change process.

Moreover, in the period B, the counting unit 163b counts the number of rises of the internal clock and updates "scod_cnt". The signal output unit 163a acquires, from the reception control unit 161, the register value "sclg_st" for setting a period from when the line data synchronous signal "slsync_n" falls to when the signal "scale_lgate" indicating input of image data to be subjected to the magnification change process is asserted.

In the period B, when "scod_cnt≥scod_num−(sclg_st+scod_dly)" is satisfied, the signal output unit 163a sets the transmission permission notification signal "gnt_n" to "Low" indicating permission and outputs the signal to the image/buffer controller 140. That is, the signal output unit 163a outputs the transmission permission notification signal "gnt_n" of "Low" indicating permission to the image/buffer controller 140 at a time earlier than a conventional time by "sclg_st" and "scod_dly" before the number of pixels "scod_cnt" processed by the magnification change process reaches the total number of pixels "scod_num", that is, before processing on all the pixels of the image data of one line being subjected to the processing is completed. Upon receiving the transmission permission notification signal "gnt_n" of "Low" indicating permission, the image/buffer controller 140 starts transmission of image data of a next line. Therefore, the period C begins while the processing is performed on the image data of one line. A timing chart of the period C (a period $C_1$, a period $C_2$, and a period $C_3$) is the same as that of the period B.

Flow of Image Processing According to the First Embodiment

Figure 4:
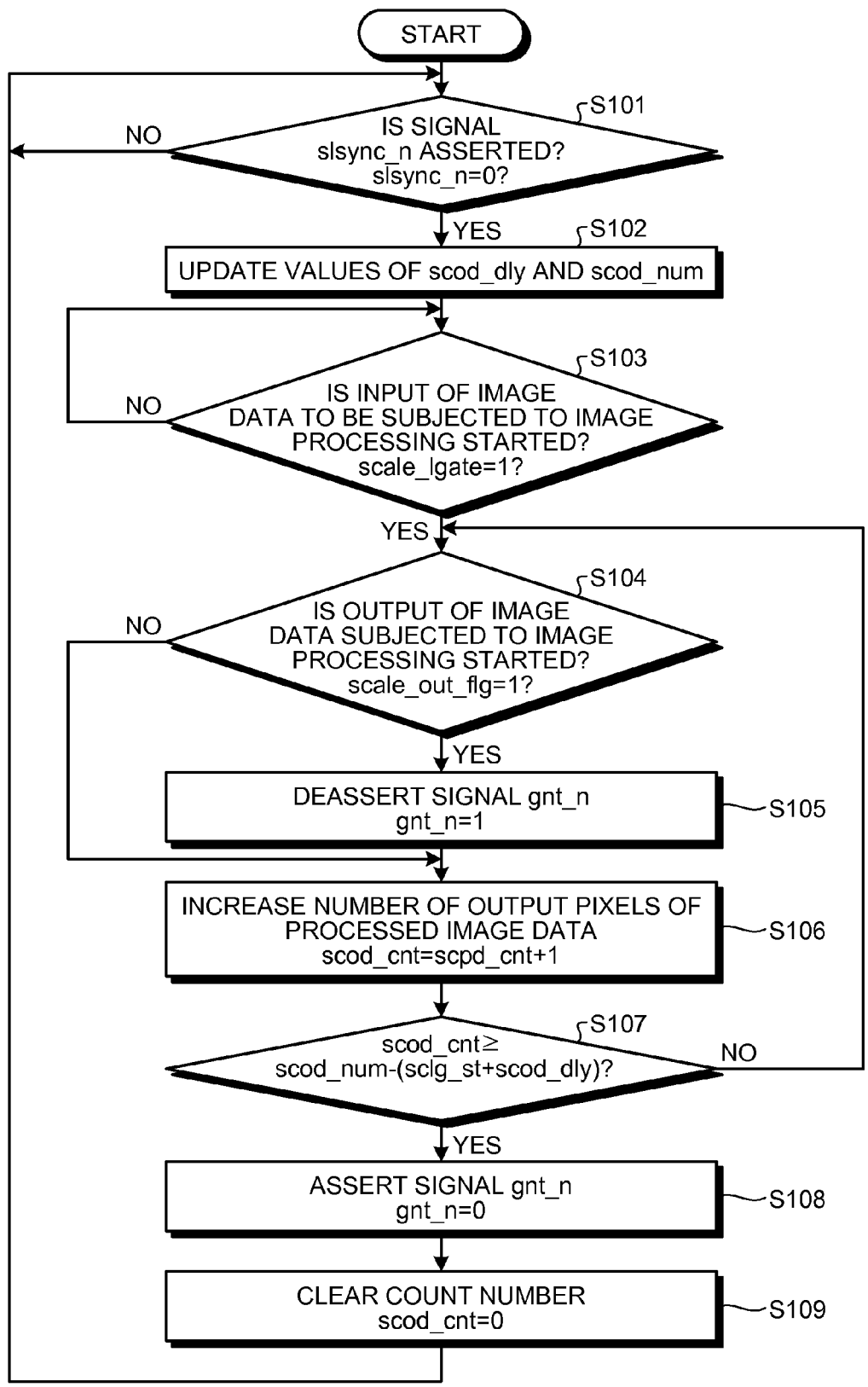
FIG. 4 is a flowchart illustrating an example of the flow of image processing according to the first embodiment.

The flow of image processing according to the first embodiment will be explained below with reference to FIG. 4. FIG. 4 is a flowchart illustrating an example of the flow of image processing according to the first embodiment. The image processing according to the first embodiment mainly indicates processing performed by the signal output unit 163a, the counting unit 163b, and the magnification change process control unit 163c.

As illustrated in FIG. 4, when the line data synchronous signal "slsync_n" is asserted (slsync_n=0) (YES at Step S101), the magnification change process control unit 163c updates the values of "scod_dly" and "scod_num" (Step S102). Then, the magnification change process control unit 163c determines whether input of the image data to be subjected to the magnification change process starts (Step S103). To determine whether the input of the image data to be subjected to the magnification change process starts, the magnification change process control unit 163c determines whether the input starts or not based on "scale_lgate".

At this time, when "scale_lgate=1 (High)", the magnification change process control unit 163c determines that the input of the image data to be subjected to the magnification change process starts (YES at Step S103), and the signal output unit 163a determines whether output of the image data subjected to the magnification change process starts (Step S104). To determine whether the output of the image data subjected to the magnification change process starts, the signal output unit 163a determines whether the output starts or not based on "scale_out_flg". On the other hand, when "scale_lgate=0 (Low)", the magnification change process control unit 163c determines that the input of the image data to be subjected to the magnification change process does not start (NO at Step S103), and waits for a start of input of the image data to be subjected to the image processing.

When "scale_out_flg=1 (High)", the signal output unit 163a determines that the output of the image data subjected to the magnification change process starts (YES at Step S104), and outputs a transmission permission notification signal "gnt_n=1 (deassertion)" to the image/buffer controller 140 (Step S105). On the other hand, when "scale_out_flg=0 (Low)", the signal output unit 163a determines that the output of the image data subjected to the magnification change process does not start (NO at Step S104), and performs a process at Step S106.

The counting unit 163b increases the number of output pixels of the image data subjected to the magnification change process such that "scod_cnt=scod_cnt+1" (Step S106). When a predetermined condition based on "scod_cnt", "scod_num", "sclg_st", and "scod_dly" is satisfied (YES at Step S107), the signal output unit 163a outputs the transmission permission notification signal "gnt_n=0 (assertion)" to the image/buffer controller 140 (Step S108). The predetermined condition is "scod_cnt scod_num−(sclg_st+scod_dly)".

On the other hand, when the predetermined condition is not satisfied (NO at Step S107), the signal output unit 163a performs the process at Step S104 and the counting unit 163b increases "scod_cnt" at Step S106. When the signal output unit 163a sets the transmission permission notification signal to "gnt_n=0 (assertion)", the counting unit 163b clears the count number such that "scod_cnt=0" (Step S109). In this way, the image processing apparatus 100 repeats the above processes to perform image processing line by line.

Advantageous Effects of the First Embodiment

As described above, when the number of processed pixels in the image data of one line being subjected to the image processing becomes equal to or greater than a result value that is obtained by subtracting, from the total number of the pixels in the image data of one line, the register value corresponding to the wait time for the image processing and subtracting the number of rises of the internal clock corresponding to the delay time for the image processing in a period from a start of input of the image data to be subjected to the image processing to a start of output of the image data subjected to the image processing; the image processing apparatus 100 outputs the transmission permission notification signal to request a start of a process on image data of a next line. Therefore, compared with the conventional technology in which the transmission permission notification signal is output after the process on all the pixels of the image data of one line is completed; the image processing apparatus 100 can improve the data transfer efficiency in the transmission of the images to the controller when the images accumulated in the memory on the engine side are subjected to image processing and transmitted to the controller.

Second Embodiment

In the first embodiment, a configuration is explained where the transmission permission notification signal is output at a time advanced by the wait time and the delay time of the magnification change process. However, the present invention is not limited by the above embodiment. It may be possible to output the transmission permission notification signal at a time advanced by a total of the wait time and the delay time of the magnification change process and a total of delay amounts of various types of image processing different from the magnification change process. Therefore, in the second embodiment, a configuration will be explained where the transmission permission notification signal is output at a time advanced by a total of delay amounts of various types of image processing different from the magnification change process in addition to the total of the wait time and the delay time of the magnification change process.

Configuration of an Image Processing Unit According to The Second Embodiment

Figure 5:
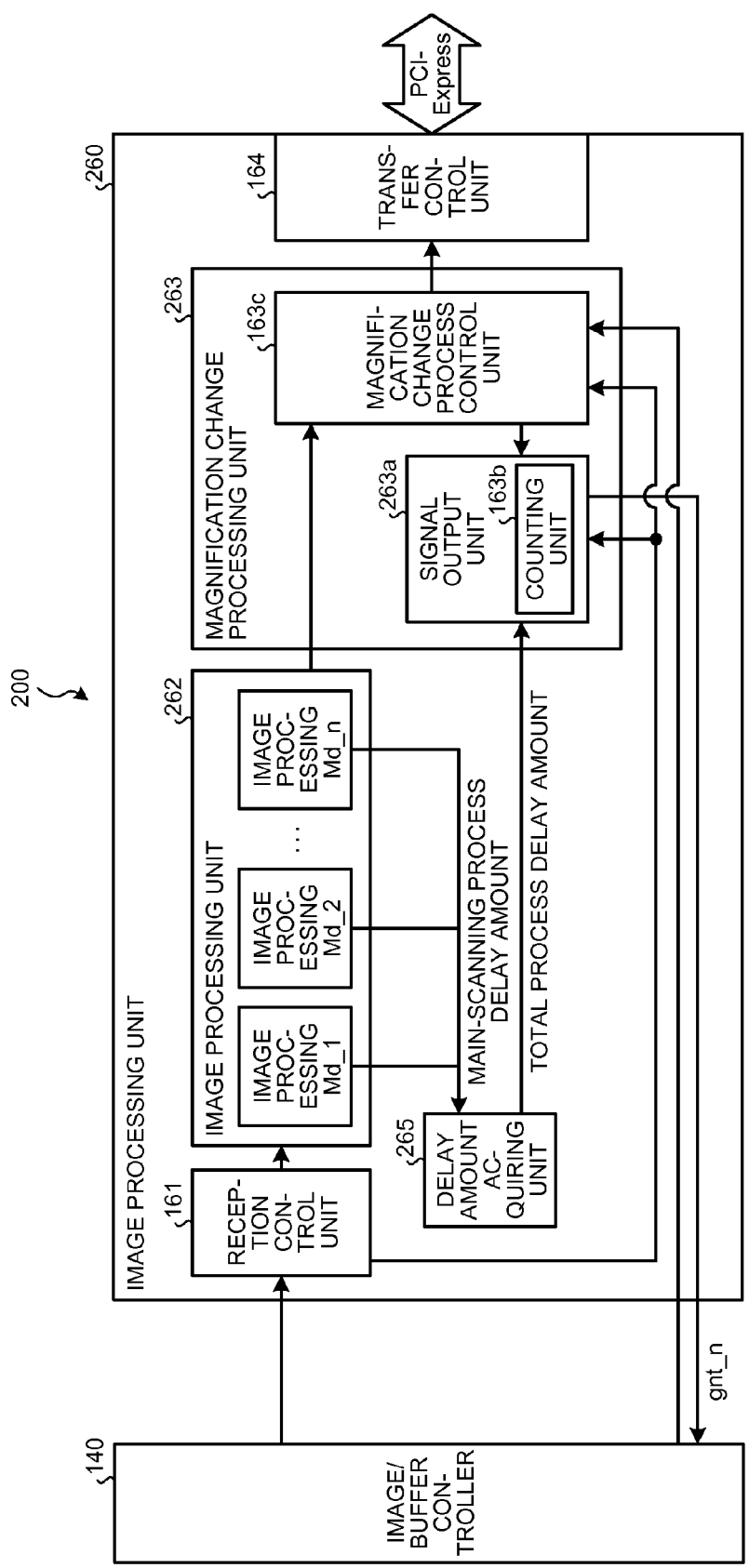
FIG. 5 is a diagram illustrating a first configuration example of an image processing unit according to a second embodiment.

FIG. 5 is a diagram illustrating a first configuration example of an image processing unit according to the second embodiment. In the second embodiment, the same components as those of the first embodiment are denoted by the same reference symbols and the same explanation will not be repeated appropriately. In FIG. 5, the functions, the configurations, and the processes except for an image processing unit 262, a magnification change processing unit 263, and a delay amount acquiring unit 265 to be described below are the same as those of the first embodiment. In FIG. 5, some of the signals and data explained in the configuration example of the first embodiment are omitted appropriately.

As illustrated in FIG. 5, in an image processing apparatus 200, an image processing unit 260 includes the reception control unit 161, the image processing unit 262, the magnification change processing unit 263, the transfer control unit 164, and the delay amount acquiring unit 265. The image processing unit 262 includes an image processing module having functions to perform various types of image processing. The magnification change processing unit 263 includes a signal output unit 263a, the counting unit 163b, and the magnification change process control unit 163c.

Image processing modules "image processing Md_1 to image processing Md_n (n is a natural number)" of the image processing unit 262 are sub modules for dividing the functions of the scanned image property correction process, the color conversion, and the gradation process performed by the image processing unit 262. Each of the image processing Md_1 to the image processing Md_n contains a main-scanning process delay amount, which indicates a delay amount in the main-scanning direction (hereinafter, described as a "main-scanning process delay amount") when each image processing is performed according to a parameter set for execution of the scanned image property correction process, the color conversion, or the gradation process. Each of the image processing Md_1 to the image processing Md_n outputs the main-scanning process delay amount to the delay amount acquiring unit 265. A timing to output the main-scanning process delay amount may be an arbitrary timing. For example, the main-scanning process delay amount may be output at a timing at which the image data is input or at which the image data subjected to the image processing is output to the magnification change processing unit 263.

The delay amount acquiring unit 265 acquires the main-scanning process delay amount output by each of the image processing modules of the image processing unit 262. The delay amount acquiring unit 265 obtains a total process delay amount by adding up the acquired main-scanning process delay amounts and outputs the total process delay amount to the signal output unit 263a.

The signal output unit 263a subtracts, from the total number of pixels "scod_num", the register value "sclg_st", the number of rises of the internal clock "scod_dly" in a period from a start of assertion of a signal indicating input of image data to be subjected to the magnification change process to a start of assertion of a signal indicating output of the image data subjected to the magnification change process, and "the total process delay amount" output by the delay amount acquiring unit 265. When the count number "scod_cnt" obtained by the counting unit 163b is equal to or greater than a result value obtained by the subtraction, the signal output unit 263a sets the transmission permission notification signal "gnt_n" to "Low" indicating permission and outputs the signal to the image/buffer controller 140.

That is, when "scod_cnt scod_num−(sclg_st+scod_dly+the total process delay amount)" is satisfied, the signal output unit 263a sets the transmission permission notification signal "gnt_n" to "Low" indicating permission and outputs the signal to the image/buffer controller 140. In other words, the signal output unit 263a sets the transmission permission notification signal "gnt_n" to "Low" indicating permission and outputs the signal to the image/buffer controller 140 at a time advanced by a time corresponding to the information on the wait time (register value) and information on the delay time (a total of the number of rises of the internal clock in a predetermined period and the delay times of various types of image processing).

Figure 6:
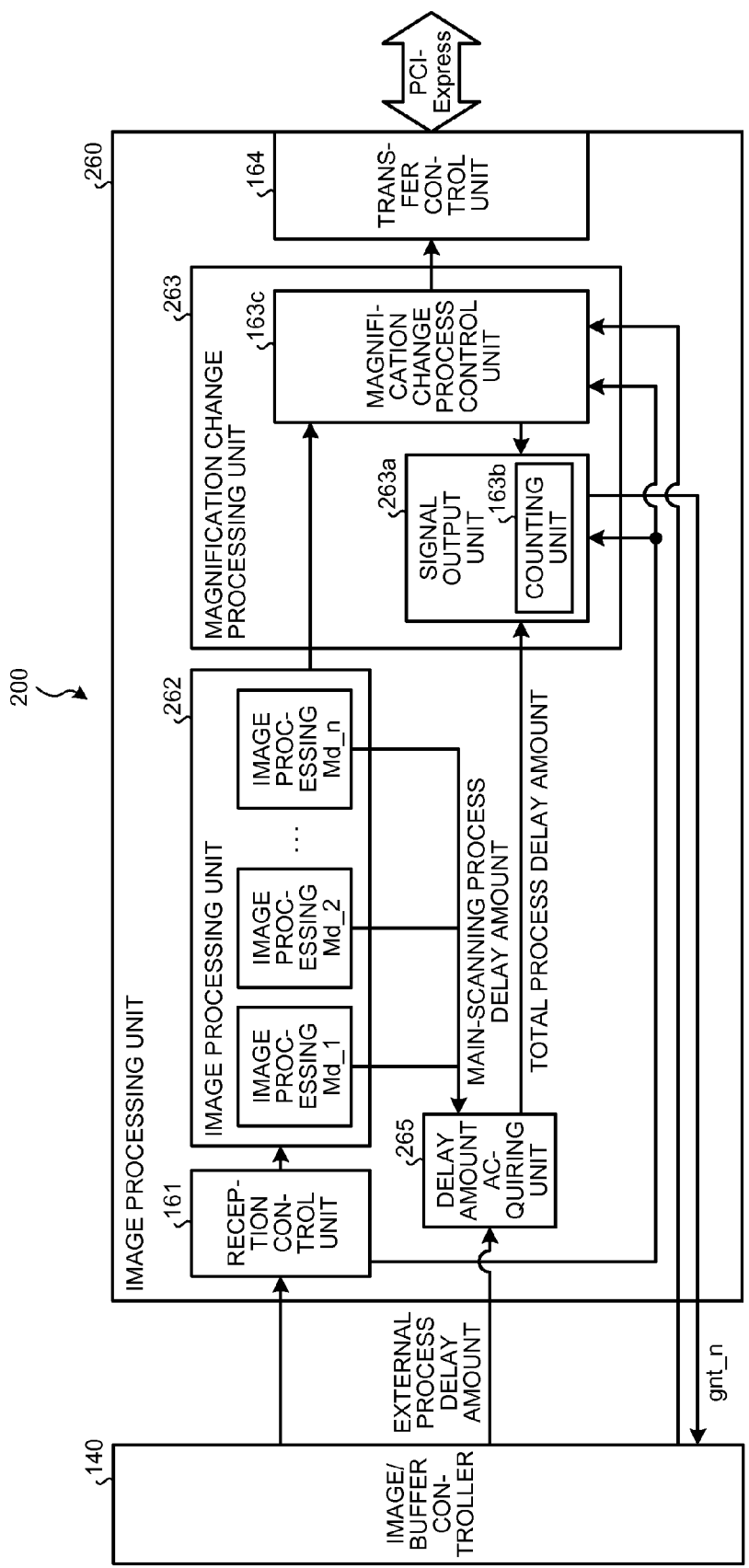
FIG. 6 is a diagram illustrating a second configuration example of the image processing unit according to the second embodiment.

FIG. 6 is a diagram illustrating a second configuration example of the image processing unit according to the second embodiment. In FIG. 6, the functions, the configurations, and the processes except for the image processing unit 262, the magnification change processing unit 263, and the delay amount acquiring unit 265 to be described below are the same as those of the first embodiment. In FIG. 6, some of the signals and data explained in the configuration example of the first embodiment are omitted appropriately.

As illustrated in FIG. 6, in the image processing apparatus 200, the image processing unit 260 includes the reception control unit 161, the image processing unit 262, the magnification change processing unit 263, the transfer control unit 164, and the delay amount acquiring unit 265. The image processing unit 262 includes an image processing module having functions to perform various types of image processing. The magnification change processing unit 263 includes the signal output unit 263a, the counting unit 163b, and the magnification change process control unit 163c. The processing performed by the image processing unit 262 is the same as the processing explained above with reference to FIG. 5, and therefore, explanation thereof will not be repeated.

The delay amount acquiring unit 265 acquires the main-scanning process delay amount output by each of the image processing modules of the image processing unit 262. The delay amount acquiring unit 265 also acquires an external process delay amount indicating a delay amount due to processing performed by an external device I/F or the like, which may not be recognized by the image processing unit 260. The value of the external process delay amount is changed or set by, for example, a register access by the CPU 130. The delay amount acquiring unit 265 obtains a total process delay amount by adding up the acquired main-scanning process delay amounts and the acquired external process delay amount and outputs the obtained total process delay amount to the signal output unit 263a.

The signal output unit 263a subtracts, from the total number of pixels "scod_num", the register value "sclg_st", the number of rises "scod_dly" of the internal clock in a period from a start of assertion of the signal indicating input of image data to be subjected to the magnification change process to a start of assertion of a signal indicating output of the image data subjected to the magnification change process, and "the total process delay amount" output by the delay amount acquiring unit 265. The total process delay amount is a sum of the main-scanning process delay amounts and the external process delay amount. When the count number "scod_cnt" obtained by the counting unit 163b is equal to or greater than a result value obtained by the subtraction, the signal output unit 263a sets the transmission permission notification signal "gnt_n" to "Low" indicating permission and outputs the signal to the image/buffer controller 140.

Specifically, when "scod_cnt scod_num−(sclg_st+scod_dly+the total process delay amount" is satisfied, the signal output unit 263a sets the transmission permission notification signal "gnt_n" to "Low" indicating permission and outputs the signal to the image/buffer controller 140. In other words, the signal output unit 263a sets the transmission permission notification signal "gnt_n" to "Low" indicating permission and outputs the signal to the image/buffer controller 140 at a time advanced by a time corresponding to the information on the wait time (register value) and the information on the delay time (the number or rises of the internal clock in a predetermined period, a total of the delay times of image processing, and a delay time caused by an external device I/F or the like).

Flow of Image Processing According to the Second Embodiment

Figure 7:
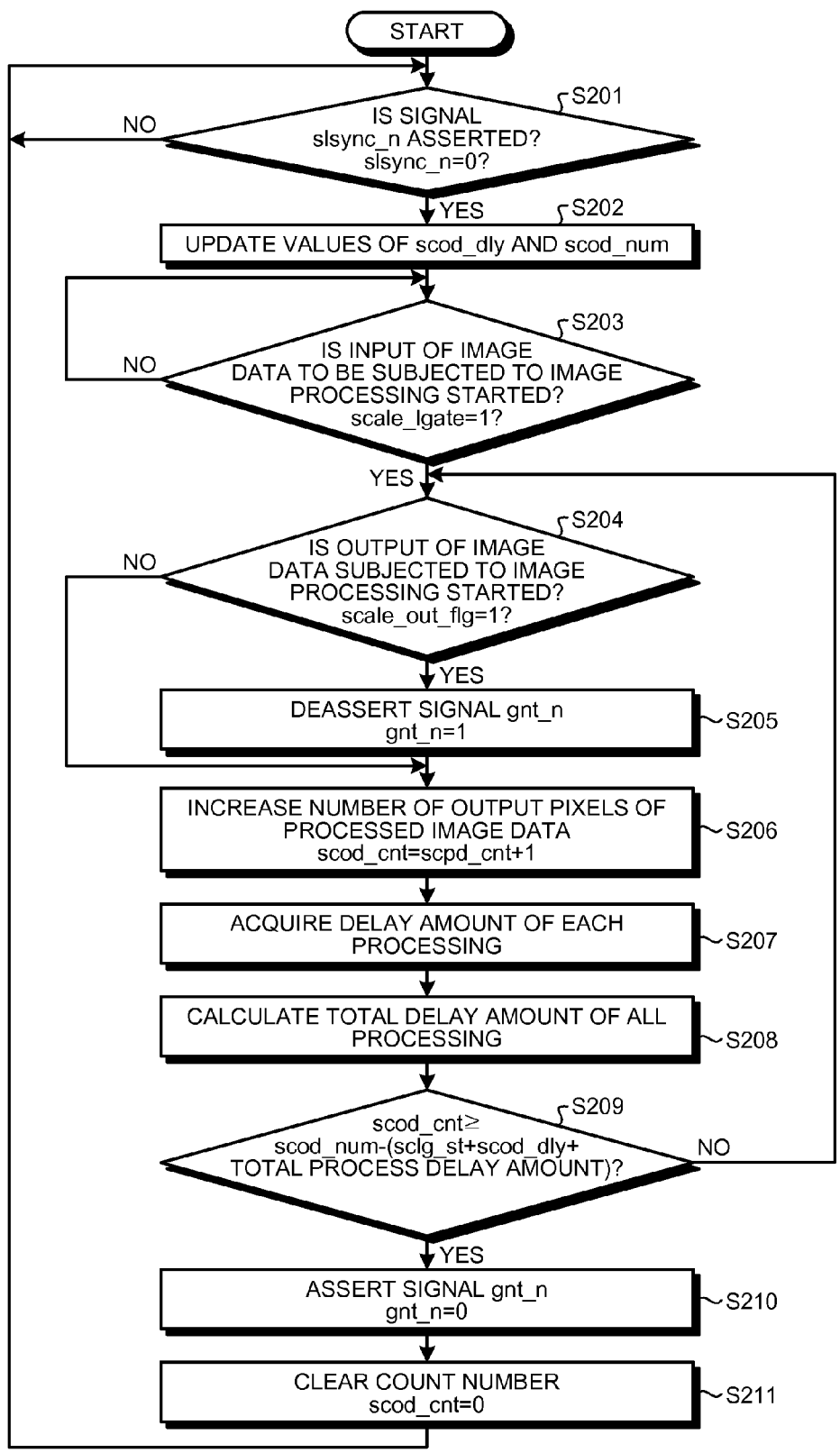
FIG. 7 is a flowchart illustrating an example of the flow of image processing according to the second embodiment.

The flow of image processing according to the second embodiment will be explained below with reference to FIG. 7. FIG. 7 is a flowchart illustrating an example of the flow of image processing according to the second embodiment. The image processing according to the second embodiment mainly indicates processing performed by the image processing unit 262, the delay amount acquiring unit 265, the signal output unit 263a, the counting unit 163b, and the magnification change process control unit 163c. In FIG. 7, explanation of the same processes as that of the first embodiment will be omitted appropriately. Specifically, the processes from Step S201 to Step S206 are the same as the processes from Step S101 to Step S106. Furthermore, the processes at Step S210 and Step S211 are the same as the processes at Step S108 and Step S109.

As illustrated in FIG. 7, the counting unit 163b increases the number of output pixels of the image data subjected to the magnification change process such that "scod_cnt=scod_cnt+1" (Step S206). The delay amount acquiring unit 265 acquires the main-scanning process delay amount output by each of the image processing modules and acquires the external process delay amount caused by an external device I/F or the like (Step S207). The delay amount acquiring unit 265 obtains a total process delay amount by adding up the acquired main-scanning process delay amounts and the acquired external process delay amount and outputs the obtained total process delay amount to the signal output unit 263a (Step S208).

When a predetermined condition based on "scod_cnt", "scod_num", "sclg_st", "scod_dly", and "the total process delay amount" is satisfied (YES at Step S209), the signal output unit 263a outputs the transmission permission notification signal "gnt_n=0 (assertion)" to the image/buffer controller 140 (Step S210). The predetermined condition is such that "scod_cnt scod_num−(sclg_st+scod_dly+the total process delay amount)".

On the other hand, when the predetermined condition is not satisfied (NO at Step S209), the signal output unit 263a performs the process at Step S204 and the counting unit 163b increases "scod_cnt" at Step S206. When the signal output unit 263a sets the transmission permission notification signal to "gnt_n=0 (assertion)", the counting unit 163b clears the count number such that "scod_cnt=0" (Step S211).

Advantageous Effects of the Second Embodiment

As described above, the image processing apparatus 200 outputs the transmission permission notification signal for requesting a start of processing on the image data of the next line at a time advanced by a time corresponding to the main-scanning process delay amounts of various types of image processing different from the magnification change process and the external process delay amount caused by an external device I/F or the like. Therefore, the image processing apparatus 200 can improve the data transfer efficiency in the transmission of the images to the controller when the images accumulated in the memory on the engine side are subjected to image processing and transmitted to the controller.

Third Embodiment

The image processing apparatus 100 and the image processing apparatus 200 according to the embodiments of the present invention are explained above. However, the present invention may be embodied in various forms other than the above embodiments. Therefore, other embodiments will be explained below in connection with (1) output of the transmission permission notification signal, (2) output of the delay amount, (3) a configuration, and (4) a program.

(1) Output of the Transmission Permission Notification Signal

In the first embodiment described above, a case is explained that the transmission permission notification signal is output at a time advanced by a time corresponding to "the register value", which is the information on the wait time, and "the number of rises of the internal clock in a predetermined period", which is the information on the delay time. However, the transmission permission notification signal may be output at a time earlier by a time corresponding to only one of the "register value" and "the number of rises of the internal clock in a predetermined period".

Specifically, the signal output unit 163a may set the transmission permission notification signal "gnt_n" to "Low" indicating permission and output the signal to the image/buffer controller 140 when "scod_cnt scod_num−sclg_st" is satisfied. Similarly, the signal output unit 163a may set the transmission permission notification signal "gnt_n" to "Low" indicating permission and output the signal to the image/buffer controller 140 when "scod_cnt scod_num−scod_dly" is satisfied. Consequently, the image processing apparatus 100 can improve the image data transfer efficiency compared with the conventional technology in which the transmission permission notification signal is output after image processing on all the pixels of the image data of one line is completed.

In the second embodiment, a configuration is explained where the transmission permission notification signal is output at a time advanced by a time corresponding to the total of the main-scanning process delay amounts and the external process delay amount. Even in this case, the transmission permission notification signal may be output at a time advanced by a time corresponding to only one of "the total of the main scanning process delay amounts" and "the external process delay amount". With regard to the main-scanning process delay amounts, it may be possible to set an image processing module whose delay amount is to be used as the main-scanning process delay amount. For example, it may be possible to output the main-scanning process delay amounts from image processing modules related to a scanned image property correction process and a color conversion but not to output the main-scanning process delay amount of an image processing module related to a gradation process. For another example, it may be possible to add up the main-scanning process delay amounts output by the image processing modules related to the scanned image property correction process and the color conversion but not to add up the main-scanning process delay amount output by the image processing module related to the gradation process. Consequently, a timing at which the transmission permission notification signal is output is differentiated.

(2) Output of the Delay Amount

In the second embodiment, a case is explained that the delay amount acquiring unit 265 acquires the main-scanning process delay amounts and the external process delay amount. However, the delay amount acquiring unit 265 may also acquire a delay amount caused by the magnification change process. For example, the magnification change process control unit 163c outputs a delay amount thereof (a magnification change process delay amount) to the delay amount acquiring unit 265. Accordingly, the delay amount acquiring unit 265 acquires the magnification change process delay amount in addition to the main-scanning process delay amount and the external process delay amount. The delay amount acquiring unit 265 obtains a total process delay amount by adding up the delay amounts and outputs the obtained total process delay amount to the signal output unit 263a. The signal output unit 263a outputs the transmission permission notification signal to the image/buffer controller 140 at a time advanced by a time corresponding to the total process delay amount including the magnification change process delay amount.

(3) Configuration

The processing procedures, control procedures, specific names, information including various types of data or parameters described or illustrated above and in the drawings may be changed appropriately unless otherwise specified. For example, as described above, it may be possible to appropriately determine what information is to be used to output the transmission permission notification signal from among "the register value", "the number of rises of the internal clock in a predetermined period", "the main-scanning process delay amounts", and "the external process delay amount". However, when the magnification change process for enlarging the image data is performed, the signal "scod_num" including the total number of pixels in the above-described predetermined condition greatly changes and a processing time may be greatly influenced by the change. Therefore, it is preferable to use the delay time of the magnification change process when the transmission permission notification signal is output.

The components of the apparatuses illustrated in the drawings are based on functional concepts. Therefore, the components need not be physically configured in the way illustrated in the drawings. Specifically, the specific mode in which the components are distributed or integrated is not limited to the ones illustrated in the drawings. A part or all of the apparatuses may be distributed or integrated either functionally or physically in arbitrary units according to various loads or use conditions.

For example, while it is explained that the counting unit 163b is included in the signal output unit 163a, the counting unit 163b need not be included in the signal output unit 163a as long as it can count the number of rises of the internal clock in the image processing during a predetermined period and notifies the signal output unit 163a of the counted number. For another example, while the signal output unit 163a receives the signal "sclg_st" containing the register value as the information on the wait time from the reception control unit 161, it may be possible to separately provide "a wait time information acquiring unit" for acquiring the information on the wait time. Similarly, while the magnification change process control unit 163c outputs the signal "scod_dly" containing information on the delay time from a start of input of image data to a start of output of the image data subjected to the magnification change process, it may be possible to separately provide "a delay time information acquiring unit" for acquiring the information on the delay time.

(4) Program

Figure 8:
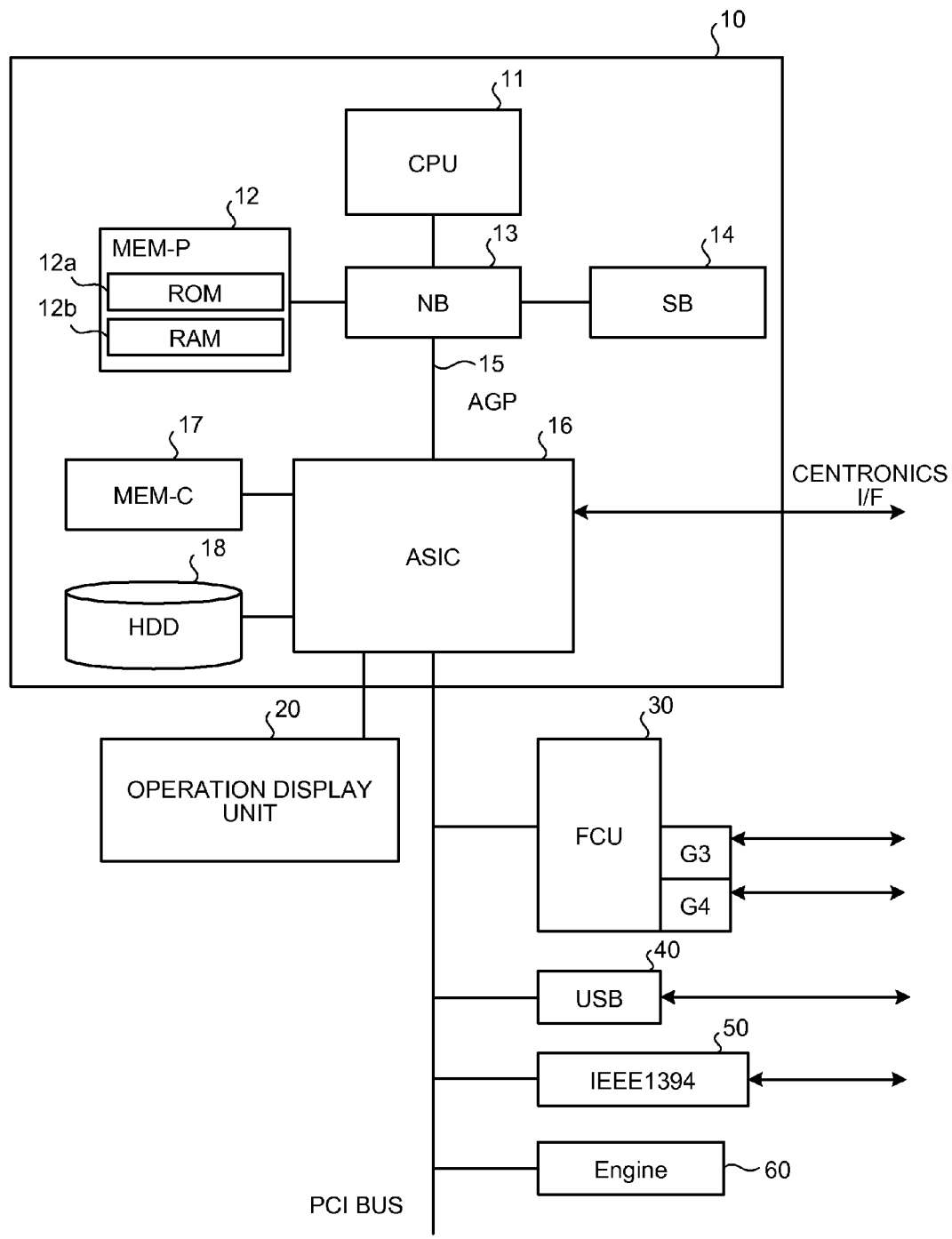
FIG. 8 is a block diagram of a hardware configuration of a multifunction printer including the image processing apparatus according to the present invention.

FIG. 8 is a block diagram of a hardware configuration of an MFP including the image processing apparatus 100 according to the present invention. As illustrated in FIG. 8, the MFP includes a controller 10 and an engine unit (Engine) 60, which are connected to each other via a PCI bus. The controller 10 is a controller that controls the entire MFP, picture processing, communications, and input operations through an operating unit. The engine unit 60 is a printer engine etc. that is connectable to the PCI bus. Examples of the engine unit 60 include a monochrome plotter, a one-drum color plotter, a four-drum color plotter, a scanner, and a facsimile unit. The engine unit 60 includes an image processing section for performing error diffusion, gamma correction, or the like, in addition to what is called an engine section, such as a plotter.

The controller 10 includes a CPU 11, a north bridge (NB) 13, a system memory (MEM-P) 12, a south bridge (SB) 14, a local memory (MEM-C) 17, an ASIC 16, and a hard disk drive (HDD) 18. The NB 13 and the ASIC 16 are connected to an accelerated graphics port (AGP) bus 15. The MEM-P 12 includes a ROM 12a and a RAM 12b.

The CPU 11 controls the entire MFP. The CPU 11 includes a chip set formed of the NB 13, the MEM-P 12, and the SB 14. The CPU 11 is connected to other apparatuses via the chip set.

The NB 13 is a bridge for connecting the CPU 11, the MEM-P 12, the SB 14, and the AGP bus 15 to one another. The NB 13 includes a memory controller for controlling read and write with respect to the MEM-P 12, and also includes a PCI master and an AGP target.

The MEM-P 12 is a system memory used as a memory for storing computer programs and data, a memory for loading computer programs and data, and a memory for use in picture drawing performed by a printer. The MEM-P 12 includes the ROM 12a and the RAM 12b. The ROM 12a is a read-only memory for storing computer programs and data. The RAM 12b is a writable and readable memory used for loading computer programs and data or used for picture processing performed by a printer.

The SB 14 is a bridge for connecting the NB 13, PCI devices, and peripheral devices to one another. The SB 14 is connected to the NB 13 via the PCI bus. A network interface (I/F) or the like is also connected to the PCI bus.

The ASIC 16 is an integrated circuit (IC) used for image processing including a hardware element for image processing. The ASIC 16 has a function as a bridge to connect the AGP bus 15, the PCI bus, the HDD 18, and the MEM-C 17 to one another. The ASIC 16 includes a PCI target and an AGP master; an arbiter (ARB) that is the central core of the ASIC 16; a memory controller that controls the MEM-C 17; a plurality of direct memory access controllers (DMACs) that rotates image data by using hardware logic; and a PCI unit that performs data transfer with the engine unit 60 via the PCI bus. A facsimile control unit (FCU) 30, a universal serial bus (USB) 40, and the institute of electrical and electronics engineers 1394 (IEEE 1394) interface 50 are connected to the ASIC 16 via the PCI bus. An operation display unit 20 is directly connected to the ASIC 16.

The MEM-C 17 is a local memory for use as a copy image buffer and a code buffer. The HDD 18 is a storage device for storing image data, computer programs, font data, and forms.

The AGP bus 15 is a bus interface for a graphics accelerator card introduced to speed up graphics operations. The AGP bus 15 allows direct access to the MEM-P 12 with a high throughput, thereby speeding up operations related to the graphics accelerator card.

The image processing program executed by the image processing apparatus 100 according to the first embodiment described above is provided by being installed in a ROM or the like. For example, the image processing program executed by the image processing apparatus 100 may be provided as a computer program product by being recorded in a computer-readable recording medium, such as a CD-ROM, a flexible disk (FD), a CD-R, or a digital versatile disc (DVD), in a computer-installable or computer-executable file format.

The image processing program executed by the image processing apparatus 100 may be provided by being stored in a computer connected to a network, such as the Internet, and by being downloaded via the network. The image processing program executed by the image processing apparatus 100 may be provided or distributed via a network, such as the Internet.

As one embodiment, the image processing program executed by the image processing apparatus 100 has a module structure made up of the above units (the image/buffer controller 140 and the image processing unit 160). As actual hardware, the CPU (the processor) reads the programs from the ROM and executes the programs to load the above units on the main memory, thereby generating the image/buffer controller 140 and the image processing unit 160 on the main memory.

In the above embodiments, an example is explained in which the image processing apparatus is applied to an MFP having at least two of a copying function, a printer function, a scanner function, and a facsimile function. However, the embodiment may be applied to any image processing apparatus, such as a copier, a printer, a scanner, or a facsimile device.

According to one embodiment, when an image accumulated in a memory on the engine side is subjected to image processing and transmitted to a controller, improve is data transfer efficiency in the transmission of the image to the controller.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
a reading unit configured to read image data, which is obtained by scanning and accumulated in a memory, from the memory line by line;
a magnification change processing unit configured to perform a magnification change process on the image data read by the reading unit and output the image data subjected to the magnification change process;
a wait time acquiring unit configured to acquire wait time information on a value corresponding to a wait time from when a synchronous signal, representing a start of read of the image data for each line, falls to when the magnification change process starts;
a signal output unit configured to output, to the reading unit, a permission signal indicating whether read of image data of a next line is permitted or denied based on the wait time information while the magnification change processing unit is outputting the image data, and a delay time acquiring unit configured to acquire delay time information on a value corresponding to a delay time from when the image data is input into the magnification change processing unit to when output of the image data subjected to the magnification change process starts, wherein the signal output unit outputs the permission signal based on the wait time information and the delay time information, to the reading unit while the magnification change processing unit outputs the image data.

2. The image processing apparatus according to claim 1, wherein the wait time acquiring unit acquires the wait time information on a period from when the synchronous signal falls to when a signal indicating input of the image data to be subjected to a process by the magnification change processing unit is asserted; and the signal outputting unit is configured to count a number of rises of an internal clock due to the magnification change process performed by the magnification change processing unit for each pixel of the image data of one line, and when the counted number of rises is equal to or greater than a result value obtained by subtracting the wait time information from the total number of pixels of the image data of one line, outputs the permission signal to the reading unit.

3. The image processing apparatus according to claim 1, wherein the wait time acquiring unit acquires the wait time information on a period from when the synchronous signal falls to when a signal indicating input of image data to be subjected to a process by the magnification change processing unit is asserted, the delay time acquiring unit acquires the delay time information on a number of rises of the internal clock of the magnification change processing unit in a period from when assertion of a signal indicating input of the image data to be subjected to a process by the magnification change processing unit starts to when assertion of a signal indicating output of the image data subjected to the magnification change process starts, and the signal output unit is configured to count a number of rises of the internal clock due to the magnification change process performed by the magnification change processing unit for each pixel of the image data of one line, and when the counted number of rises is equal to or greater than a result value obtained by subtracting the wait time information and the delay time information from the total number of pixels of the image data of one line, outputs the permission signal to the reading unit.

4. The image processing apparatus according to claim 1, further comprising:

an image processing unit configured to perform image processing different from the magnification change process before the magnification change process; and a delay amount acquiring unit configured to acquire a main-scanning process delay amount, indicating a delay amount in a main-scanning direction to perform the image processing, from a module that executes the image processing, wherein the signal output unit outputs the permission signal to the reading unit based further on the main-scanning process delay amount.

5. The image processing apparatus according to claim 4, wherein the delay amount acquiring unit further acquires an external process delay amount indicating a delay amount due to processing performed by an external device separate from the magnification change processing unit and the image processing unit, and the signal output unit outputs the permission signal to the reading unit based further on the external process delay amount.

6. A non-transitory computer-readable storage medium comprising an executable program code stored therein, wherein the program codes when executed by a computer instructs the computer to perform:

reading image data, which is obtained by scanning and accumulated in a memory, from the memory line by line;

performing a magnification change process on the image data read at the reading;

outputting the image data subjected to the magnification change process;

acquiring wait time information on a value corresponding to a wait time from when a synchronous signal, representing a start of read of the image data for each line, falls to when the magnification change process starts, outputting a permission signal indicating whether read of image data of a next line is permitted or denied based on the wait time information while the image data is being output at the outputting; and acquiring delay time information on a value corresponding to a delay time from when the image data is input into the magnification change processing unit to when output of the image data subjected to the magnification change process starts, wherein outputting the permission signal, based on the wait time information and the delay time information, to the reading unit while the magnification change processing unit is outputting the image data.

7. An image processing method for an image processing apparatus, the image processing method comprising:

reading, by a reading unit of the image processing apparatus, image data, which is obtained by scanning and accumulated in a memory, from the memory line by line;

performing, by a magnification change processing unit of the image processing apparatus, a magnification change process on the image data read at the reading;

outputting, by the magnification change processing unit of the image processing apparatus, the image data subjected to the magnification change process;

acquiring, by a wait time information acquiring unit of the image processing apparatus, wait time information on a value corresponding to a wait time from when a synchronous signal, representing a start of read of the image data for each line, falls to when the magnification change process starts, outputting, by a signal output unit of the image processing apparatus, a permission signal indicating whether read of image data of a next line is permitted or denied based on the wait time information while the image data is being output at the outputting; and acquiring delay time information on a value corresponding to a delay time from when the image data is input into the magnification change processing unit to when output of the image data subjected to the magnification change process starts, wherein outputting the permission signal, based on the wait time information and the delay time information to the reading unit while the magnification change processing unit is outputting the image data.

* * * * *